United States Patent
Tamai et al.

(10) Patent No.: US 6,775,119 B2
(45) Date of Patent: Aug. 10, 2004

(54) ELECTRICAL CONNECTION SYSTEM FOR VEHICLE

(75) Inventors: Yasuhiro Tamai, Shizuoka-ken (JP); Tetsuya Hasegawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/205,391

(22) Filed: Jul. 26, 2002

(65) Prior Publication Data

US 2003/0032308 A1 Feb. 13, 2003

(30) Foreign Application Priority Data

Aug. 7, 2001 (JP) .................................... P 2001-239438

(51) Int. Cl.$^7$ ................................................ H02H 3/20
(52) U.S. Cl. ........................................ 361/91.1; 361/56
(58) Field of Search .................... 361/91.1, 56, 18, 361/54, 57, 88, 93.1, 104, 86, 58; 307/9.1, 10.1

(56) References Cited

U.S. PATENT DOCUMENTS 4,985,671 A 1/1991 Sauer 6,046,896 A * 4/2000 Saeki et al. .................... 361/86
6,222,282 B1 * 4/2001 Rossi et al. .................. 307/9.1
6,384,489 B1 * 5/2002 Bluemel et al. ........... 307/10.1

FOREIGN PATENT DOCUMENTS

| EP | 0 078 620 A1 | 5/1983 |
|---|---|---|
| EP | 0 257 404 A2 | 3/1988 |
| JP | 10-84626 | 3/1998 |

* cited by examiner

*Primary Examiner*—Stephen W. Jackson
*Assistant Examiner*—James A Demakis
(74) *Attorney, Agent, or Firm*—Finnegan, Henderson, Farabow, Garrett & Dunner, L.L.P.

(57) ABSTRACT

The electrical connection system includes a power source circuit for outputting a first voltage to operate a first load circuit. The power source circuit includes a conversion circuit for converting the first voltage into a second voltage lower than the first voltage. The system includes a second load circuit operative in response to the second voltage. The system includes a protection circuit for shunting the second load circuit with a threshold voltage between the first voltage and second voltage. The threshold voltage has identical influence on the second load circuit relative to the first voltage.

12 Claims, 4 Drawing Sheets

(A) LOWER-VOLTAGE-SIDE VOLTAGE (B) CONTROL SIGNAL OUTPUT (C) SWITCH CURRENT

ELECTRICAL CONNECTION SYSTEM FOR VEHICLE

BACKGROUND OF THE INVENTION

The present invention relates to an electrical connection system for a vehicle which includes a high-voltage battery supplying higher voltage than that required for driving vehicle load in the vehicle. This system converts electrical power from a high-voltage battery and supplies it to handle the vehicle power load.

In recent years, a development is pursued to enhance fuel economy. According to this development, high-voltage power source of 42V is connected to a motor generator. This power source drives various vehicle loads mounted in an automobile.

This high-voltage power source is mounted in an in-car multiplex communication system. This system includes a signal line wired in the vehicle and a power source line. In this system, each ECU (Electrical Control Unit) controls the vehicle load provided in each portion of the vehicle. Each ECU requires a low-voltage power source as low as 5V.

As disclosed in Japanese Patent Application Laid-open No.H10-84626, when high-voltage from the high-voltage power source is converted into low-voltage in this system, the high-voltage is collectively converted using a DC/DC converter in a junction box, and electricality is distributed to each ECUs.

SUMMARY OF THE INVENTION

In the electricity distributing method, however, when failure of ECU or the like causes for short-circuit between a low-voltage circuit which is activated by low voltage and a high-voltage circuit which transmits high voltage, high voltage is applied to every low-voltage circuit including a plurality of ECUs. With this application of voltage, normally activating ECUs or output side of the DC/DC converter in the junction box are brought into overvoltage state.

Even when a fuse is inserted into the junction box and a low-voltage electrical wire between ECUs, high voltage is adversely applied to the low-voltage circuit unless current which blows out the fuse flows.

According to the conventional system, if a failure is caused in a single ECU out of a plurality of ECUs connected to each other, there is an adverse possibility that this failure interfere with all the low-voltage circuits.

The present invention designs an electrical connection system for a vehicle. With this system, even if a failure is caused in a single vehicle load out of a plurality of vehicle loads handling different voltage, other vehicle loads can reliably be protected.

The first aspect of the invention is directed to an electrical connection system for a vehicle. The system includes: a voltage converter including an input terminal connected to a first power supply line to supply a first voltage for converting the first voltage into a second voltage to be output to first vehicle-mounted loads through a second power supply line. The system includes a first voltage supplier branched from the first power supply line for supplying the first voltage to each of second vehicle-mounted loads. The system includes fuses provided respectively to the second vehicle-mounted loads between the voltage converter and each of the second vehicle-mounted loads on the second power supply line; a switch provided between the voltage converter and the fuses, with a terminal connected to the second power supply line, and with another terminal connected to a ground terminal. The system includes a voltage detector provided between the voltage converter and the fuses for detecting a voltage to be supplied to the second power supply line. The system includes an overvoltage protector configured to turn on the switch to connect the second power supply line to the ground terminal, when the overvoltage protector decides an overvoltage to occur on the second power supply line due to occurring a short circuit between the first power supply line and the second power supply line at a vehicle-mounted, load, based on a voltage to be detected by the voltage detector.

Preferably, the second vehicle-mounted loads include electrical control units (ECU) for controlling vehicle-mounted electrical components.

Preferably, the fuses are adapted for the first voltage.

The second aspect of the invention is directed to an electrical connection system. The system includes a power source circuit for outputting a first voltage to operate a first load circuit. The power source circuit includes a conversion circuit for converting the first voltage into a second voltage lower than the first voltage. The system includes a second load circuit operative in response to the second voltage. The system includes a protection circuit for shunting the current from the second load circuit when a threshold voltage in the second load circuit exceeds a maximum rated voltage of the second load circuit that is between the first voltage and second voltage. The threshold voltage affects the second load circuit in substantially the same way as when the first voltage is applied to the second load circuit.

Preferably, the protection circuit includes a switch connected to the second load circuit.

Preferably, the protection circuit includes a controller for comparing the second load circuit with the threshold voltage to output a signal for closing the switch.

Preferably, the first and second load circuits include an electrical component connected thereto, for activating by the second voltage to control the first voltage.

Preferably, the second load circuit includes an overcurrent device connected to the electrical component.

BRIEF DESCRIPTION OF THE ACCOMPANYING DRAWINGS

FIG. 5 is an illustrative view of a structure of a trunk line which connects junction boxes or the like.

DETAILED DESCRIPTION OF THE PREFERRED EMBODIMENTS

Embodiments of the present invention will be explained with reference to the drawings below.

Figure 1:
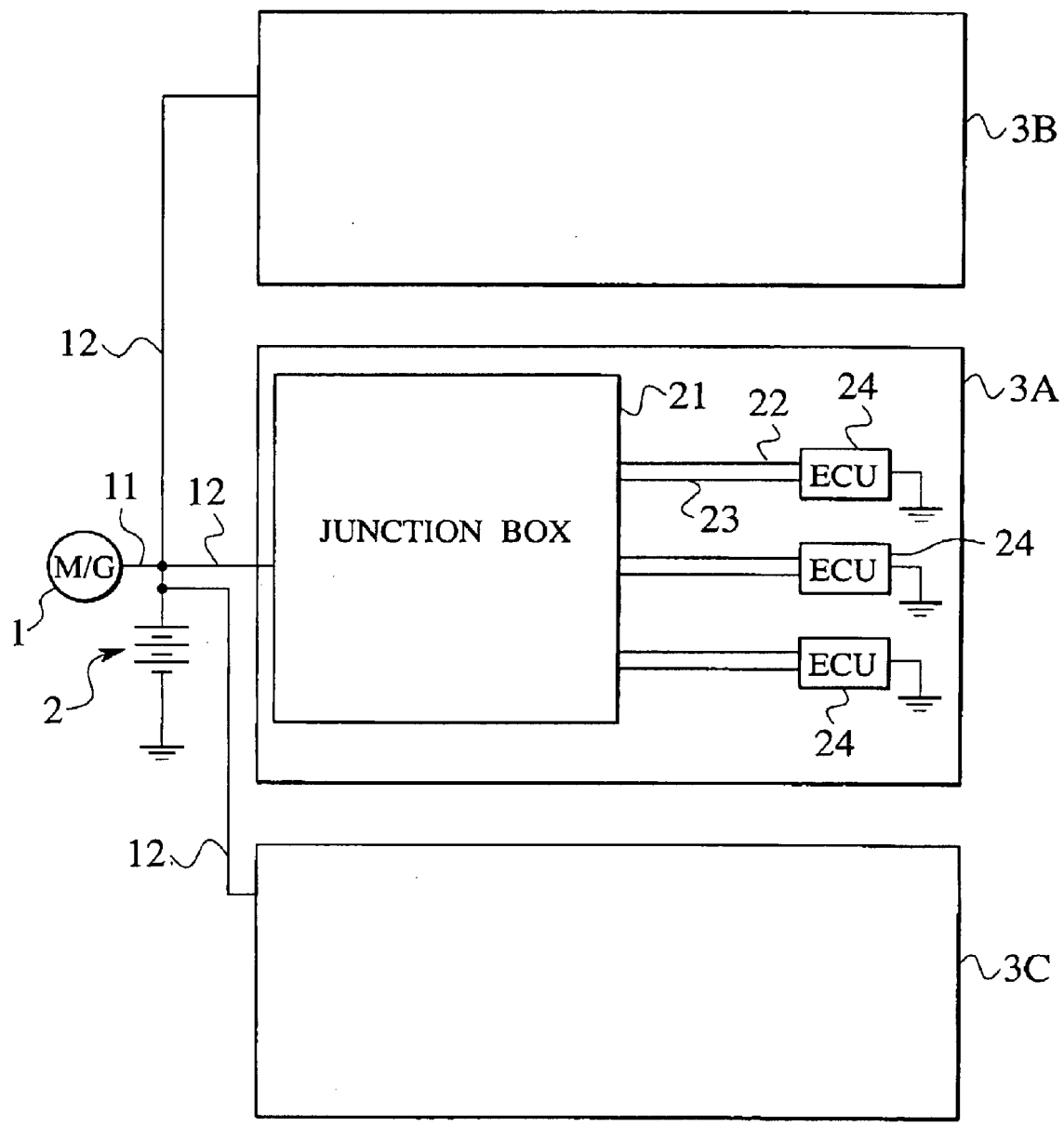
FIG. 1 is a circuit diagram showing a structure of an electrical connection system for a vehicle to which the present invention is applied.

The invention is applied to an electrical connection system in a vehicle having a structure shown in FIG. 1 for example.

The electrical connection system for a vehicle includes motor generator 1. The system includes high-voltage battery 2 connected to generator 1 through high-voltage power supply line 11. The system includes a plurality of vehicle controllers 3 connected to battery 2 through high-voltage trunk lines 12. In this system, high voltage generated in generator 1 is charged into battery 2. Battery 2 supplies the charged high voltage to plurality of control systems 3 (3A, 3B and 3C) through trunk lines 12.

Figure 5:
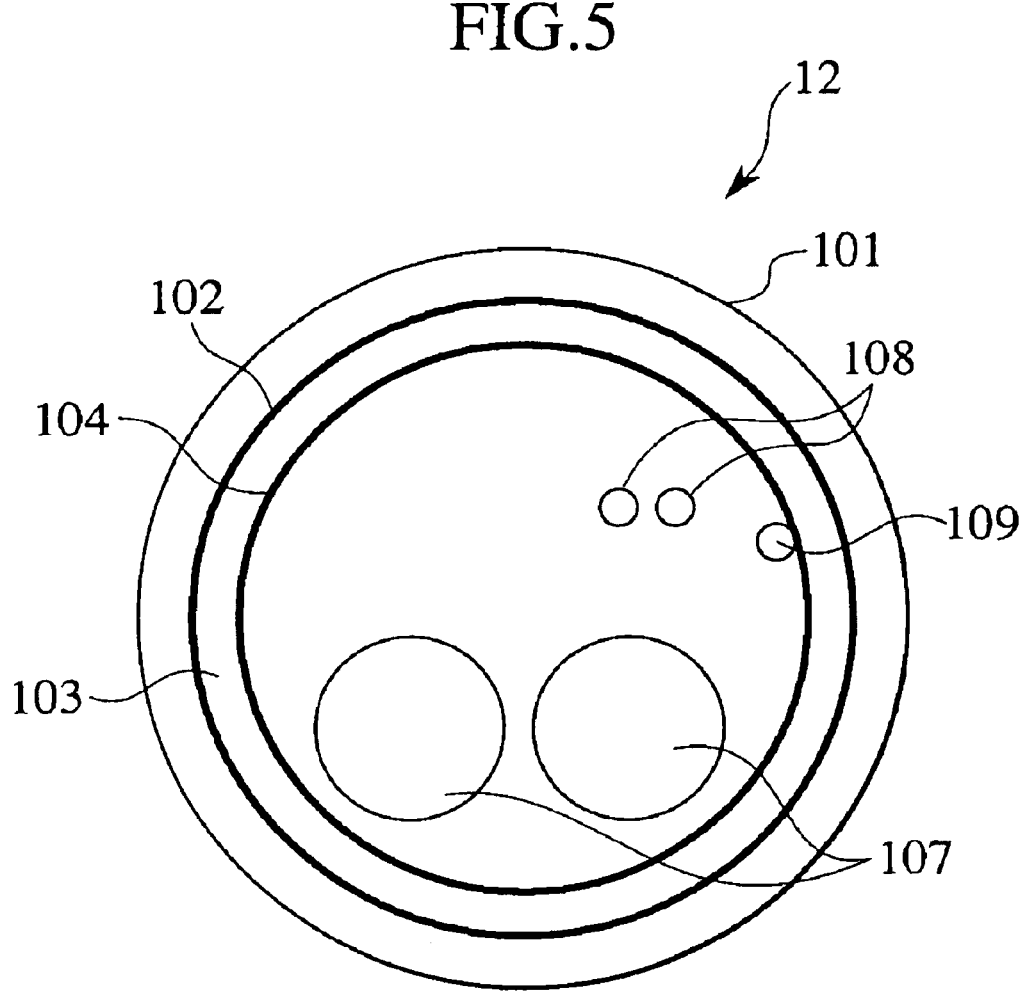

As shown in FIG. 5, trunk line 12 includes coating layer 101, and reinforcing layer 102 is disposed inside coating layer 101. Short-circuit detecting layer 104 is disposed inside reinforcing layer 102 through sheath 103. Various electrical lines are disposed inside detecting layer 104. The various electrical lines are power source lines 107 connected to an output end of battery 2, e.g., multiple signal lines 108 and drain lines 109 such as twist lines for signal from operation switches.

As shown in FIG. 1, each control system 3 includes junction box (J/B) 21 connected to trunk line 12. System 3 includes a plurality of ECUs (electrical control unit) 24 connected to junction box 21 through high-voltage power supply line 22 and low-voltage power source line 23. High voltage 42V is supplied to system 3. System 3 drives ECUs 24 with low voltage of 5V as vehicle load to be driven.

Low voltage is supplied to each ECU 24 from DC/DC converter 31 through low-voltage fuse 34 to activate the ECU. ECU 24 sends and receives information to and from another ECU 24, and controls another vehicle mounted electrical component.

Figure 2:
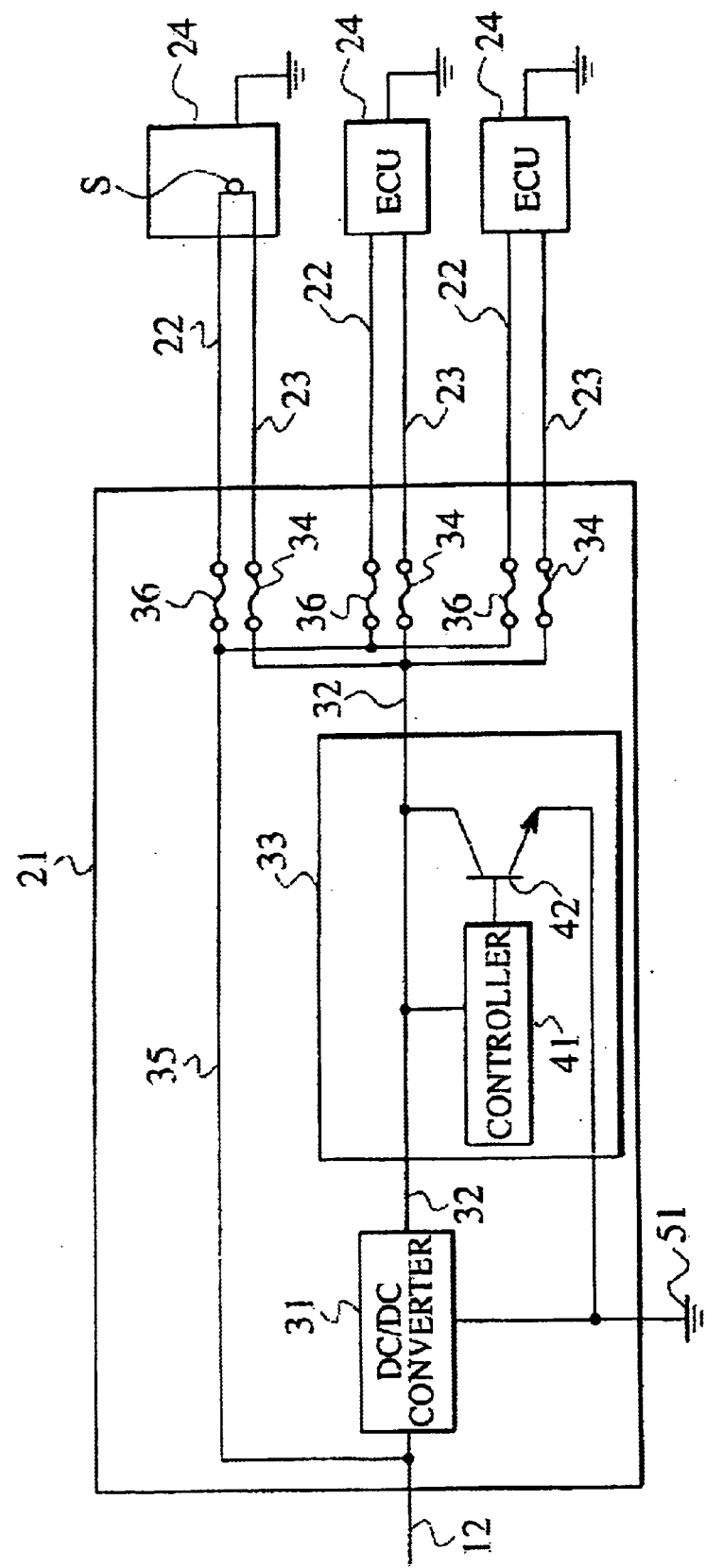
FIG. 2 is a circuit diagram showing a structure of a junction box in FIG. 1.

As shown in FIG. 2, junction box 21 includes converter 31 which is connected to trunk line 12 and to which high voltage is supplied. Junction box 21 includes an overvoltage protection circuit 33 connected to converter 31 through low-voltage power source line 32. Junction box 21 includes low-voltage fuse 34 connected to circuit 33 through line 32. Junction box 21 includes high-voltage fuse 36 connected to an input terminal of converter 31 through high-voltage power supply line 35.

High voltage is supplied to converter 31 through trunk line 12. Converter 31 converts the high voltage into low voltage to be supplied to protecting circuit 33 through low-voltage power source line 32. Converter 31 converts high voltage of 42V for example into low voltage of 5V which is driving voltage of ECU 24, to be supplied to protecting circuit 33.

Protecting circuit 33 includes controller 41 connected to low-voltage power source line 32 between converter 31 and fuse 34. Protecting circuit 33 includes switching element connected to line 32, i.e., switch 42, e.g., a transistor. Switch 42 is disposed closer to fuse 34 than controller 41, i.e., between controller 41 and the fuse 34.

Protecting circuit 33 monitors voltage of the low-voltage circuit which is output side of converter 31, using a comparator. If controller 41 detects that overvoltage which is higher than a preset predetermined voltage value such as a maximum rated voltage of a low-voltage load 24 (threshold voltage) is generated, controller 41 generates a control signal to be supplied to switch 42. This control signal turns on switch 42. A terminal of switch 42 is connected to low-voltage power source line 32. The other terminal of switch 42 is connected to grounding terminal 51.

High voltage is supplied to junction box 21 through trunk line 12. High voltage is supplied to ECU 24 through high-voltage fuse 36 and high-voltage power supply line 22. High voltage is converted into low voltage by converter 31.

The low-voltage is supplied to ECU 24 through line 32, protecting circuit 33 and fuse 34. With this, each ECU 24 is activated by the low voltage. ECU 24 drives another vehicle load circuit (not shown) with high voltage.

In the above system, 42V may be converted into 7V by converter 31, the 7V may be converted into 5V by a series regulator in ECU 24 as driving voltage of ECU 24.

In this system, failure is caused in one of the plurality of ECUs 24, and high-voltage power supply line 22 and low-voltage power source line 23 are short circuited at portion S. As shown with time T1 in FIGS. 3 and 4, this short-circuit applies high voltage (42V) to low-voltage power source line 23 and low-voltage fuse 34 from high-voltage power supply line 22 (A1 in FIG. 4). Then, if controller 41 detects the overvoltage (42V) of line 32, controller 41 supplies a control signal to switch 42 to turn ON switch 42.

Figure 3:
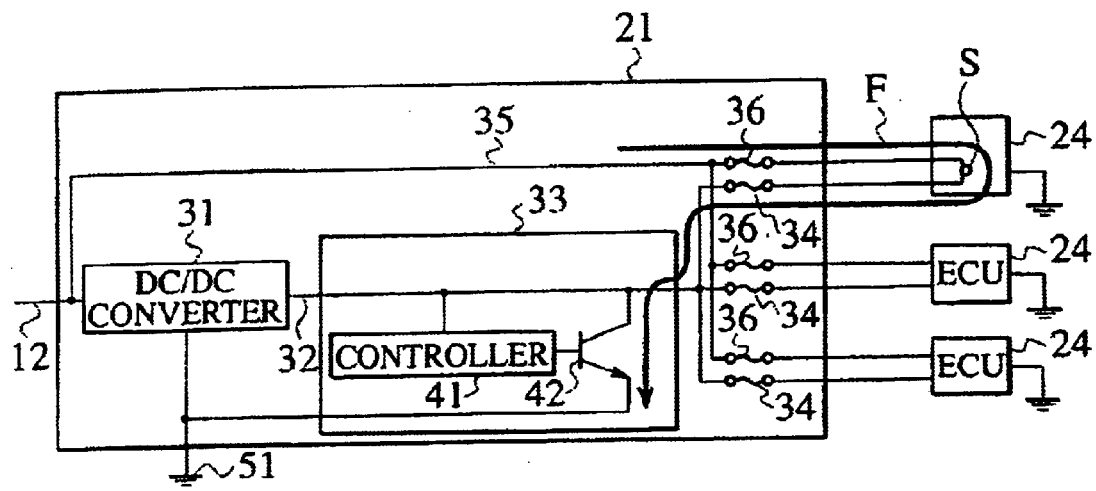
FIG. 3 is an illustrative view of flow of current when short-circuit is generated in ECU in FIG. 2.
Figure 4:
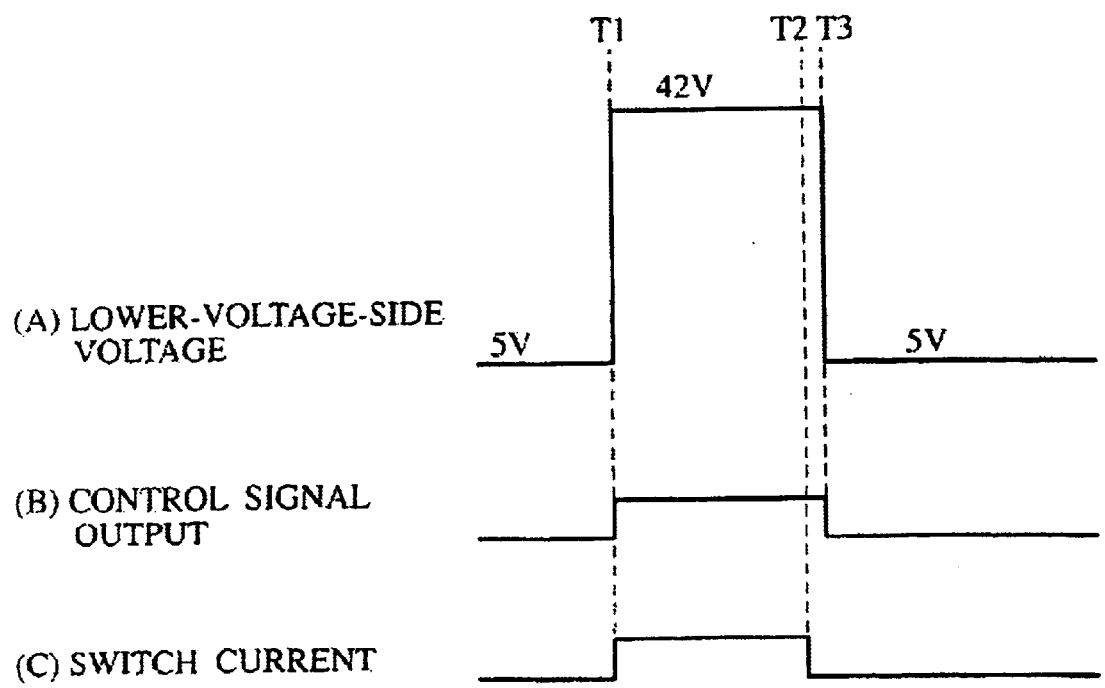
FIG. 4 is a timing chart showing a relation of voltage of a low-voltage circuit, operation of a controller and current flowing through a switch when a high-voltage power supply line and a low-voltage power source line are short circuited.

With this, low-voltage power source line 23 and grounding terminal 51 are connected to each other. Next, the great current flows into low-voltage power source line 23 due to the short-circuit. The current is shunted into grounding terminal 51 through fuse 34 and switch 42 as shown in FIG. 3 (C1 in FIG. 4). Then, the current flows through switch 42 up to time T2, and blows out fuse 34 at time T3. At that time, fuse 34 on the first ECU is blown out by the great current, but since great current does not flow through the second ECU 24 different than the first ECU 24, the fuse 34 on the second ECU 24 is not blown out.

Here, in the case of a known fuse of 14V exceeding low voltage (5V) as fuse 34, strong scattering in the fuse is caused by high voltage (42V) and the insulative resistance of the fuse 34 fails. Thus, the high-voltage fuse (42V) is used for short-circuiting circuits with currents including voltages between the high voltage (42V) and low voltage (5V).

At time T3, fuse 34 is blown out. Controller 41 again detects that voltage of line 32 is low voltage (5V) (A1 in FIG. 4). At that time, controller 41 stops supply of a control signal to switch 42 to turn OFF switch 42.

With this, according to the electrical connection system, even if failure is caused in one of plurality of ECUs 24 and short circuit is caused between high-voltage power supply line 22 and low-voltage power source line 23, supply of great current to other ECUs 24 through lines 32 and 22 is prevented.

Even if the high-voltage circuit and the low-voltage circuit are short circuited by inside failure, the overvoltage is detected by controller 41 connected to the low-voltage circuit to turn ON switch 42. With this, great current can be shunted into grounding terminal 51 from the low-voltage circuit. The shunt allows fuse 34 of the low-voltage circuit to be blown out.

As shown in FIG. 1, plurality of ECUs 24 are activated using low voltage converted by single converter 31. In this case, if failure is caused in one of ECUs 24 and short circuit is caused between high-voltage power supply line 22 and low-voltage power source line 23, low-voltage power source line 32 is brought into overvoltage state. At that time, switch 42 is turned ON by controller 41, and failed ECU 24 and grounding terminal 51 can be connected to each other.

Fuse 34 connected to failed ECU 24, and influence on other normally actuating ECUs 24 can be avoided.

Since only a fuse of failed ECU 24 can reliably be blown out, stopped state of all low-voltage circuits on the output side of converter 31 can be avoided, and the low-voltage system can reliably be protected.

When a vehicle mounted electrical component is controlled by ECUs 24, even if one of ECUs 24 is failed and short circuit is generated between high-voltage power supply line 22 and low-voltage power source line 23, great current is not supplied to other ECUs 24 to cause failure, and other vehicle mounted electrical components controlled by other ECUs 24 can normally be operated.

The electrical connection system in a vehicle has been explained based on ECUs as vehicle loads constituting low-voltage circuits, but the present invention is not limited to this, and the invention can be applied to a vehicle load which is operated by other low voltage of course.

The entire contents of Japanese Patent Applications P2001-239438 (filed Aug. 7, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An electrical connection system for a vehicle, comprising:
   a voltage converter including an input terminal connected to a first power supply line to supply a first voltage for converting the first voltage into a second voltage to be output to vehicle-mounted loads through a second power supply line;
   a first voltage supplier branched from the first power supply line for supplying the first voltage to each of the vehicle-mounted loads;
   fuses provided between the voltage converter and each of the vehicle-mounted loads on the second power supply line;
   a switch provided between the voltage converter and the fuses, with a terminal connected to the second power supply line, and with another terminal connected to a ground terminal;
   a voltage detector provided between the voltage converter and the fuses for detecting a voltage to be supplied to the second power supply line;
   an overvoltage protector configured to turn on the switch to connect the second power supply line to the ground terminal when the overvoltage protector decides an overvoltage to occur on the second power supply line due to occurring a short circuit between the first power supply line and the second power supply line at a vehicle-mounted load, based on a voltage to be detected by the voltage detector.

2. An electrical connection system for a vehicle, comprising:
   a voltage converter including an input terminal connected to a first power supply line to supply a first voltage for converting the first voltage into a second voltage to be output to vehicle-mounted loads through a second power supply line;
   a first voltage supplier branched from the first power supply line for supplying the first voltage to each of the vehicle-mounted loads;
   fuses provided between the voltage converter and each of the second vehicle-mounted loads on the second power supply line;
   a switch provided between the voltage converter and the fuses, with a terminal connected to the second power supply line, and with another terminal connected to a ground terminal;
   a voltage detector provided between the voltage converter and the fuses for detecting a voltage to be supplied to the second power supply line; and
   an overvoltage protector configured to turn on the switch to connect the second power supply line to the ground terminal when the overvoltage protector decides an overvoltage to occur on the second power supply line due to occurring a short circuit between the first power supply line and the second power supply line at a vehicle-mounted load, based on a voltage to be detected by the voltage detector,
   wherein the second vehicle-mounted loads include electrical control units (ECU) for controlling vehicle-mounted electrical components.

3. The electrical connection system according to claim 1, wherein the fuses are configured to blow out when the fuses are subjected to the first voltage.

4. An electrical connection system, comprising:
   a power source circuit for outputting a first voltage to operate a first load circuit, the power source circuit including a conversion circuit for converting the first voltage into a second voltage lower than the first voltage;
   a second load circuit operative in response to the second voltage; and
   a protection circuit for shunting a current from the second load circuit when a threshold voltage through the second load circuit exceeds the second voltage,
   wherein the threshold voltage affects the second load circuit in substantially the same was as when the first voltage is applied to the second load circuit.

5. The electrical connection system according to claim 4, wherein the protection circuit includes a switch connected to the second load circuit.

6. The electrical connection system according to claim 5, wherein the protection circuit includes a controller configured to compare a voltage of the second load circuit with the threshold voltage and to output a signal for closing the switch.

7. The electrical connection system according to claim 4, wherein the first and second load circuits include an electrical component connected thereto, the electrical component being configured to be activated by the second voltage and control the first voltage.

8. The electrical connection system according to claim 7, wherein the second load circuit includes an overcurrent device connected to the electrical component.

9. An electrical connection system for a vehicle, comprising:
   a voltage converter including a first terminal connected to a first power supply line and a second terminal connected to at least one vehicle mounted load via a second supply line, the voltage converter being configured to convert a first voltage from the first supply line into a second voltage for the second power supply line;
   a first voltage supplier configured to supply the first voltage to at least one vehicle mounted load, the first voltage supplier being connected to the first power supply line;
   at least one fuse disposed on the second power supply line between the voltage converter and the at least one vehicle mounted load; and
   a switch with a first terminal connected to the second power supply line between the voltage converter and the at least one fuse, and a second terminal connected to a ground terminal;
   wherein when a short circuit occurs between the first power supply line and the second power supply line substantially at the at least one vehicle mounted load, the switch is configured to connect the second power supply line to the ground terminal.

10. The system of claim 9, wherein the at least one vehicle mounted load is at least two vehicle mounted loads and the at least one fuse is at least two fuses, and wherein the at least two fuses are disposed between the voltage converter and each of the at least two vehicle mounted loads.

11. The system of claim 9, wherein the at least one vehicle-mounted load is at least one electrical control unit (ECU) configured to control vehicle-mounted electrical components.

12. The system of claim 9, wherein the at least one fuse is configured to blow out when the at least fuse is subjected to the first voltage.

* * * * *

UNITED STATES PATENT AND TRADEMARK OFFICE
CERTIFICATE OF CORRECTION

PATENT NO. : 6,775,119 B2
DATED : August 10, 2004
INVENTOR(S) : Yasuhiro Tamai et al.

It is certified that error appears in the above-identified patent and that said Letters Patent is hereby corrected as shown below:

Column 5,
Line 62, before "vehicle-mounted", delete "second".

Column 6,
Line 12, before "vehicle-mounted", delete "second".
Line 27, "through" should read -- in --.
Line 30, "was" should read -- way --.

Signed and Sealed this

First Day of March, 2005

JON W. DUDAS
*Director of the United States Patent and Trademark Office*